E. MARAWSKE.
CUTTING TOOL.
APPLICATION FILED DEC. 31, 1912.

1,085,452.  Patented Jan. 27, 1914.

UNITED STATES PATENT OFFICE.

ERNST MARAWSKE, OF BERLIN, GERMANY.

CUTTING-TOOL.

1,085,452.  Specification of Letters Patent.  Patented Jan. 27, 1914.

Application filed December 31, 1912. Serial No. 739,506.

*To all whom it may concern:*

Be it known that I, ERNST MARAWSKE, manufacturer, a subject of the King of Prussia, residing at Berlin, in the Kingdom of Prussia, in the German Empire, have invented certain new and useful Improvements in Cutting-Tools; and I do hereby declare the following to be a full, clear, and exact description of the invention, such as will enable others skilled in the art to which it appertains to make and use the same.

The present invention has for its object a disk-shaped cutting tool for employment on all kinds of turning lathes, revolver lathes, automatic shapers, edging and planing machines.

Disk-shaped edging tools have long been known, but these known tools have presented the grave defect that, particularly in the case of work of larger diameters, they readily bind or owing to the removal of the cooling medium become heated on the cutting edge whereby their cutting capacity is largely reduced. These defects are overcome by means of the present invention which permits of cutting work of large diameter without the risk of the parting tool becoming bound in the work and without excessive heating of the cutting edge.

The present invention is illustrated in the accompanying drawing, in which:—

Figure 1:
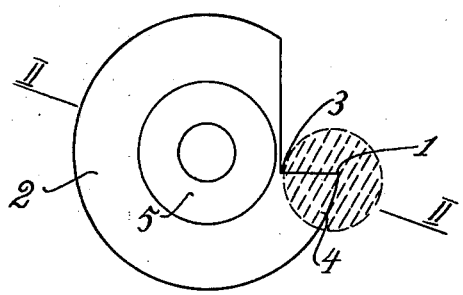
Figure 2:
Figure 3:
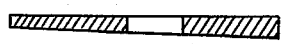

Figure 1 shows a tool embodying the invention in elevation. Fig. 2 is a cross section thereof on the line II—II. Fig. 3 is a cross section of another form of tool.

An ordinary disk shaped edging tool, from which a piece is cut at the beginning in order to obtain the cutting edge 1, is dimensioned in accordance with the present invention in such a manner that the disk of the edging tool presents its greatest thickness at the point 1 and toward the center and toward the end of the corresponding diameter, that is to say at the point 2, presents the smallest thickness. Owing to the constant diminution of the thickness on the outer periphery of the edging tool, not only is the thickness of the cutting edge diminished on the line 1—3 but the thickness on the line 1—4 on the periphery of the parting tool is also diminished, so that it is impossible for the edging tool, to bind or stick on the outer edge. This can readily be seen from Fig. 1, in which the circle shown in broken lines represents the work to be cut off. In order to reinforce the parting tool a thin collar 5 can be provided on both sides.

In the construction illustrated in Fig. 3 this lateral collar is omitted and this kind of edging tool in conjunction with specially formed, obliquely cut away intermediate disks, renders it possible to fix the edging tool to the tool holder in a particularly firm manner by clamping action.

Having thus described my invention, I claim as new and desire to secure by Letters Patent:—

A tool for cutting in a direction radially of its axis comprising a relatively thin disk having the side surfaces thereof uniformly converging transversely of the disk, and the thickest portion of said disk being cut away to provide a cutting edge of decreasing thickness toward the center of the disk, substantially as described.

In testimony whereof, I have affixed my signature, in presence of two witnesses.

ERNST MARAWSKE.

Witnesses:
 HENRY HASPER,
 WOLDEMAR HAUPT.

Copies of this patent may be obtained for five cents each, by addressing the "Commissioner of Patents, Washington, D. C."